Oct. 4, 1932.     M. BERMAN     1,880,683
STRESS DETERMINING SCALE
Filed May 27, 1930
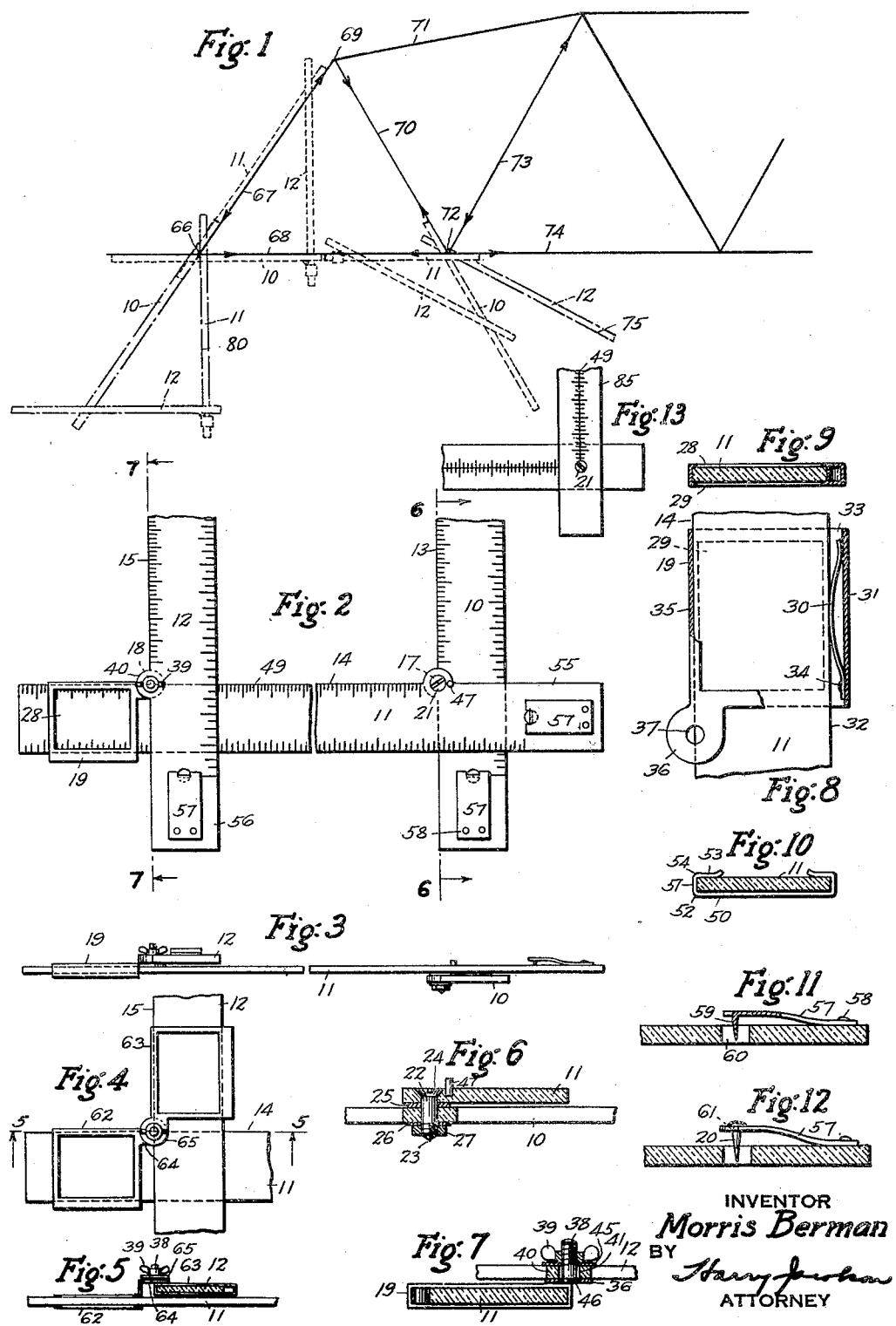
INVENTOR
Morris Berman
BY
ATTORNEY Patented Oct. 4, 1932

1,880,683

UNITED STATES PATENT OFFICE

MORRIS BERMAN, OF BROOKLYN, NEW YORK

STRESS DETERMINING SCALE

Application filed May 27, 1930. Serial No. 456,022.

This invention relates to instruments for mechanically determining stresses in structures from the truss diagrams therefor.

With respect to indeterminate structures, stresses in the members may be found as described and shown in my prior patent for stress measuring machines, dated July 22nd, 1930, No. 1,770,907. For determinate structures, however, it has been customary heretofore to determine the stresses in the truss or similar structure by first making a truss diagram to scale including lines representing points of application, directions, and magnitudes of the extraneous forces applied to the structure. From the truss diagram, a stress diagram is made, the lines of which represent the various forces in the members of the truss as well as the applied forces, the stress diagram being made to a weight scale wherein the linear measurements represent units of force such as pounds or tons. The stress diagram consists of a series of force polygons usually joined together and representing the forces arranged about any joint of the truss or structure which forces are, of course, assumed to be in equilibrium. It is well known that if all the forces about any joint are known with the exception of two of the forces, and that if the lines of application of the two unknown forces are given, a force polygon forming part of the stress diagram may be drawn to scale to determine the directions and magnitudes of the unknown forces. Forces or stresses thus determined at one joint may be used for the force polygon at the next joint, thus proceeding from joint to joint until all unknown stresses are determined.

In drawing stress diagrams in practice, however, errors constantly occur. Such errors may be due to the failure of the draftsman to draw the force in the stress diagram exactly parallel to the corresponding member of the truss or force; to the failure to obtain an accurate intersection between the two lines of the stress diagram owing to the acute angle sometimes obtained; the failure to use a very sharp pencil and other inaccuracies inherent in drafting methods; to the use of such a scale for the diagram which, while adequate for forces approximating each other in magnitude, is inadequate where large and comparatively small forces are acting on the same truss, whereby the size of the diagram either becomes unwieldy or is too small for accuracy; to the difficulty in determining in advance, the size of the sheet necessary for drawing the stress diagram; to expansion and shrinkage of the paper under changing atmospheric conditions. The accurate drawing of a stress diagram is therefore a time-consuming and tedious process. Emergencies sometimes arise, necessitating the immediate determination of the stress at certain points of a structure for erection purposes, and this can only be done by approximation by present methods unless, indeed, the time for making the stress diagram is consumed.

My invention therefore contemplates the provision of an instrument which may be applied directly to the truss diagram and which when arranged in the proper position, may be used to determine mechanically, the magnitude of the unknown forces at any joint, whereby the errors and inaccuracies above described in the drafting of stress diagrams may be avoided.

My invention further contemplates the provision of a method for mechanically determining the stresses in the members of the truss, or similar structure, without the necessity for making a stress diagram, and a method for checking the stress diagram after it has been made.

The various objects of my invention will be clear from the description which follows and from the drawing, in which, Fig. 1 is a portion of a truss diagram, showing in dotted lines how my invention would be applied thereto for determining the stresses in the members.

Fig. 2 is a top plan view of the preferred form of my improved instrument, which I will term a "stressograph", showing a pair of graduated straight-edges pivotally secured together, and a third graduated straight-edge slidably pivoted to one of the others.

Fig. 3 is an edge view of the same.

Fig. 4 is an elevational view of a portion of my improved instrument, showing a modified form of the slidable pivot for the straight-edges.

Fig. 5 is a vertical section of the pivot shown in Fig. 4, taken on the line 5—5 of Fig. 4.

Fig. 6 is a similar section of a pivotal mounting taken on the line 6—6 of Fig. 2.

Fig. 7 is a similar section, taken on the line 7—7 of Fig. 2.

Fig. 8 is a top plan view of the slide and pivot which I may use in connection with my improved instrument.

Fig. 9 is a sectional view of the same.

Fig. 10 is a similar section of another form of slide.

Fig. 11 is a similar section of the end portion of one of the straight-edges showing the means for temporarily securing the straight-edge in position to the paper or drawing board, and Fig. 12 is a similar view of a modified form of said means, and Fig. 13 is a top plan view of a modified form of what I term the "straight-edges" or "straight-edge members", showing that the straight line made therefor may be arranged otherwise than at the edge of the member.

In that practical embodiment of my invention which I have illustrated by way of example, and referring particularly to Figs. 2 and 3, I have shown a set of three-straight-edge members 10, 11 and 12, secured together in such a manner that the members 10 and 11 are preferably permanently pivoted together at the intersection 17 of their edges 13 and 14, while the members 11 and 12 are slidably pivoted together at the intersection 18 of their edges 15 and 14.

It will be understood, however, that a series of straight-edge members greater in number than three, may be used if desired to form force polygons having more than three sides, and that said members may be suitably pivoted together by means of the sliding pivots soon to be described.

It will also be understood that the member 10 is arranged underneath the member 11, and that the latter member is arranged underneath the member 12, so that the intersections 17 and 18 may be moved relatively into axial alignment should it be required to do so. It will further be understood that either or both of the intersections 17 and 18 may be made slidable by providing a suitable slide on which the pivot mounting is made. I prefer, however, to provide at the intersection 17, the stationary or permanent pivot 21 (Figs. 2 and 6), permanently securing the scales as 10 and 11 together.

The permanent pivot 21 located at the intersection 17 of the members 10 and 11 is a friction pivot or bearing of the type commonly used in compasses, dividers and the like, so that the members which are so pivoted together may be set at any angle, and are maintained by the friction of the pivot joint in the position into which they are set. The friction joint, however, allows the scales to be swung at any angle to each other manually. As illustrated in Fig. 6, the pivot 21 consists of the screw 22, preferably pointed at its lower end 23 so that it may be pressed into the paper and drawing-board and counter-sunk at its head 24 into the upper member 10. A friction washer as 25 is interposed between the members and a similar washer as 26 is interposed between the securing nut 27 on the end of the screw and the under face of the scale 10. It will be understood that for the nut 27, a suitable wing-nut, designed to be quickly tightened or loosened, may be substituted if desired.

At least one of the pivotal mountings for the members may be made slidable along one of the members by providing said mounting on a slide as 19. As illustrated in Figs. 8 and 9, the slide 19 is preferably made of sheet metal in the form of a comparatively long loop extending beyond the edge of the member on which it slides.

Suitable openings as 28 and 29 are made on the front and rear surfaces of the slide through which openings the subdivisions on the member 10 are visible. In order that the slide may move parallel to itself at all times along the member 10, a suitable spring such as the sheet spring 30 is interposed between one of the edges 31 of the slide and the adjacent edge 32 of the member 10, said spring being arranged in the space 33 of the slide and being secured as by means of the rivet 34 to the edge 31. Said spring serves to draw the opposite edge 35 of the slide into firm contact with the edge 13 of the member 10 and to maintain the edge of the slide at all times parallel to the edge of the straight-edge member. An extension or lug 36 projects from the slide and is perforated as at 37 for the reception of a pivot screw 38. The center of the hole or perforation 37 lies exactly in the line of the edge 14. In order to pivotally secure the straight-edge member 12 to the slide 19, said member is provided with a lug as 40 perforated as at 41 for the reception of the screw 38.

The center of said hole or perforation 41 is arranged opposite the zero of the straight-edge member 12 on the edge 15, and lies in the line of said edge. A suitable friction joint, similar to the joint hereinbefore described in connection with Fig. 6, is provided between the member 11 and the slide lug 36, including the washer 45 and wing-nut 39. The screw 38 is arranged with its head 46 preferably lowermost and countersunk into the lug 36. The wing-nut 39 allows the joint to be tightened and loosened as desired, though it will be seen that any ordinary nut or other securing means may be used to cooperate with the screw 38 to provide the friction joint desired.

So that the screws 22 and 38 may be vertically aligned precisely over the proper point of the straight-edge members, a suitable stop as 47 may be provided adjacent the screw 22 and in such position as to prevent movement of the slide 19 therepast.

It will be understood that instead of making the slide 19 in the form of a substantially closed loop as illustrated and previously described, said slide may be made of spring material as illustrated in Fig. 10 and may be arranged to slide on the member without the necessity for using a spring. For example, the slide may consist of the front face 50 having the proper aperture therein to allow the graduation of the scales 49 to be visible therethrough, and having the side walls 51 joined to the front face as by means of the flexible corner 52, and having the rear spring walls 53 flexibly joined to the sides 51 as at the corners 54. The tendency of the rear walls 53 of the slide to close upon the front wall 50 causes the side walls 51 to engage the edges of the straight-edge member and to maintain the slide in proper position as it is moved along said member.

It will be noted that each of the members 11 and 12 are provided with end extensions 55 and 56 projecting past the lugs 40 and the zero points thereof. Said extensions need not be graduated since they are used merely to enable the arrangement of the members in reverse position, or an angle of 180° to their original positions as will be more fully described hereinafter. The ends of the members 10, 11 and 12 may be provided with suitable means for movably holding said members in the position into which they are temporarily set. As illustrated in Fig. 11, said means takes the form of a pronged spring 57, secured at one of its ends to the straight-edge member as by means of the rivet or screw 58, and having a pointed prong 59, integral therewith and bent downward therefrom and arranged in the opening 60 of the member.

The spring 57 is suitably shaped to maintain the pointed end of the prong above the under face of the member, but said pointed end may be manually pressed through the hole 60 into the paper and into the drawing board to which the paper is attached, to hold the end of the member in the position into which it is rotated about its pivot. As shown in Fig. 12, the prong 59 may be omitted and a headed tack or other suitable pointed element 20 substituted therefor. A shouldered portion as 61 may be provided for preventing movement of the element in the spring. By so providing securing points on the straight-edge members, one or more of said members may be secured in place to the drawing board, and the others may be moved about as desired without changing the position of at least one of the members.

As shown in Figs. 4 and 5, at least one pair of members need not be directly connected, but may be slidably and pivotally secured together by means of a pair of slides as 62 and 63. The slide 62 carries the lug 64 and the slide 63 carries a similar lug 65, both similar to the lug 36, and joined together by the screw 38 and the nut 39, whereby the members 11 and 12 may slide past each other in any direction.

The members 10, 11 and 12 may be suitably graduated to provide scales on each of the edges thereof and on both faces of said edges, thereby providing two scales on each edge. The scales may be subdivided in the usual manner in which engineering scales are divided, that is, in 10ths and integral multiples thereof such as 20ths, 30ths, 40ths, 50ths and the like.

Said members are preferably made of flexible material such as celluloid so that the faces thereof may be flexed enough to bring adjacent faces into contact for obtaining accurate intersections and so that the scales on the under face may be visible through the upper face whereby the graduations may be so arranged as to obtain smaller subdivisions than would be possible if all of the graduations were put on one face of the member.

In using my improved instrument to determine the stresses in the members of a truss, the various straight-edges are arranged along the lines of the truss diagram at the particular joint at which the stresses are to be determined, the truss diagram and the loads thereon having been first plotted.

For example, in the truss diagram shown in Fig. 1, the reaction 80 is first computed in the ordinary manner. As shown by the dotted lines consisting of short dots, one of the pivots such as the permanent pivot 21 at the intersection 17, is then arranged at the joint 66 after which the member 11 is arranged with its edge 14 coinciding with the line 67 representing the stress in the end post of the truss. The member 10 is then arranged with its edge 13 along the line 68 representing the stress in the lower chord. The slide 19 with the member 12 attached thereto, is now moved along the member 11 until the screw 38 thereof strikes the stop 47, whereupon the screws 38 and 22 are vertically aligned over the joint intersection 66. The member 12 is now rotated about the screw 38 into the proper position to bring the edge 15 into coincidence with the line 80 representing the reaction. Said member 12 having been set in the proper position, (in this case, vertically), the pivot 21 is not disturbed, but the slide 19 is moved upwardly and toward the right along the member 11 until the edge 15 of the member 12 intersects the member 10 at a point spaced from the center of the screw 38 the distance corresponding to the magnitude of the reaction at the weight scale which has been assumed for the graduation of the member as shown by the vertical dotted line position of the member 12, Fig. 1. The distance between the joint intersection 66 and the point where the edge 15 intersects the edge 13 will determine the magnitude of the stress in the member 67 when multiplied by the weight scale. Similarly, the distance between the joint intersection 66 and the point where the edge 15 intersects the edge 14 will determine the magnitude of the stress in the member 68.

It will be understood that when the slide 19 is moved as above described, the angular position of the member 12 remains unchanged, that is, said member is moved parallel to itself. To maintain the members 10 and 11 in their proper positions while the slide 19 is being manipulated, the prongs 59 or pointed elements 20 at the ends of said members may be pressed into the drawing board, the pointed end 23 of the pivot screw 22 being similarly pressed into the board at the initiation of the operation. Similarly, when the proper position of the member 12 has been reached, said member may also be secured to the board temporarily while the readings are being taken. The stresses in the members 67 and 68 having been determined, the instrument may be moved to the joint 69 where the stresses in only two of the members 70 and 71 are then unknown and the operation repeated in the same manner to determine the unknown stresses in said members 70 and 71.

The instrument may then be moved to the joint 72 where there are four stresses, two of which, namely, the stresses in the members 68 and 70 have been determined as aforesaid. Since the preferred form of my improved instrument, which I will term a "stressograph", as above described, contains three scales only, it is desirable to find the resultant of the stresses in the members 68 and 70 before the unknown stresses 73 and 74 are determined. Toward this end, as shown by the dotted lines consisting of short dots at the joint 72, the member 11 may be arranged with the pivot point 21 at the joint 72, and the edge 14 coinciding with the line 68. The member 10 is now swung on its pivot 21 until the edge 13 on the extension of the member 10 coincides with the line 70, and said edge becomes the prolongation of said line, as indicated by the dotted lines (Fig. 1) at the joint 72. To find the resultant of the stresses in the truss members 68 and 70, the slide 19 is moved along the member 11 until the pivot point thereof is arranged at the proper distance from the pivot 21 to indicate the stress in the member 68.

The member 12 is now swung on its pivot until the edge 15 thereof intersects the edge 13 at that distance from the pivot 21 which corresponds to the magnitude of the stress 70 at the weight scale used for the diagram. The intercepted distance along the edge 15 measured from the center line of the screw 38 to its point of intersection with the edge 13, is the resultant of the stresses 68 and 70, and said distance is noted. Without moving the members 10 and 11, the slide 19 together with the member 12 may now be moved until the pivot of the slide coincides with the pivot 21, that is, until the screw 38 touches the stop. The member 12 is thereby arranged in the proper position at the joint 72 (as shown by the dash and dot lines) to give the resultant of the stresses 68 and 70 in physical form and to be combined with the unknown stresses in the truss members 73 and 74 to determine said unknown stresses in the same manner as has been explained in connection with the joint 66. I prefer, however, to avoid extensive manipulation of the straight-edge members, by drawing the line 75 along the edge 15 to indicate the resultant, and then to rearrange the straight-edge members, proceeding as has been explained in connection with the joint 66.

It will be understood that as the member 12 is moved from the position shown by the dotted lines in Fig. 1 with respect to the joint 72 by the movement of the slide 20, the angular position of said member 12 remains unchanged and that after its proper position at the joint 72 has been reached, the member 12 may be secured to the board, ready for the movement of the other members to complete the solution of the joint, in accordance with the method above described, since only three forces are then involved.

By the use of more than three straight-edge members and the use of suitable slides such as 19, 62 and 63 to replace the fixed pivot 21, as may be found necessary or desirable, and as will be obvious to those skilled in the art, the step of drawing a resultant such as 75 of two known forces may be omitted, and a quadrilateral may be formed by the stressograph, instead of a triangle to which the above description has been limited.

For example, a set of four scale-carrying members as 10, 11 or 12 and a fourth similar member may be pivoted together by means of double slides 62, 63 at all of the intersections thereof excepting one, so that members may be arranged in a straight line or in a quadrilateral of the desired shape and size. That is, at least two of the members carry only one pivot, as shown in Figs. 2 and 3 in connection with three members instead of four. One of the pivots such as one which is slidable on the member 10, is arranged at the joint 72. The member 10 is then arranged with its scale coinciding with the line 68 in which the stress is known. Another member as 11 carried by the pivot thus arranged at the joint 72 is similarly arranged on the line 70 in which the stress is also known, and the sliding pivot with the member 11 is carried along the member 10 to the left until it reaches the point on said member determining the stress in the truss member 68.

A second pivot carrying a third member as 12 is arranged on the member 11 at the proper distance from the pivot for the member 11 corresponding to the stress in the member 70 at the weight scale used, after the member 12 has first been brought to the joint 72 and arranged parallel to the line 73 in which the stress is unknown. The member 12 near one end therefore intersects the member 11 at the required point and is parallel to the line 73, and at its other end crosses the line 68. Said member 12 slidably and pivotally carries a fourth member which has a free end unconnected to any other member.

The slidable pivot for the fourth member is now arranged on the line 68 or its prolongation, and is rotated into position passing through the joint 72 and coinciding with the line 74 in which the stress is unknown. In this particular example, the scale edges of the fourth member and of the member 10 overly each other since the lines 68 and 74 happen to be aligned with each other or are prolongations of each other. The intercepted distance on the fourth scale-carrying member, measured from its pivot, to the joint 72 gives the stress in the truss member 74 when multiplied by the weight scale used. Similarly, the distance on the member 12 intercepted between the member 10 and the fourth member determines the stress in the truss member 73 to which it is parallel.

If it is desired to use only three scale-carrying members at the joint 72, such members should be slidably pivoted together by the double slides 62 and 63. In that case, the resultant of the stresses in the known members 68 and 70 is found as hereinbefore described, and the member 12 arranged at the joint 72 as previously pointed out, but the line 75 need not be drawn. Instead, the member 11 is rotated into position to coincide with the line 73, while the member 10 is similarly rotated to coincide with the line 74. The member 12 is then moved away from the joint 72, parallel to itself, until the amount of the resultant is intercepted between the members 10 and 11. The distance along the member 10 from its point of intersection with the member 12 to the joint 72 determines the stress in the truss member 73. Similarly, the stress in the truss member 74 can be read.

Of course, the identical or equivalent force polygons may be formed differently than as above described. For example, going back to the first joint 66, the polygon may be formed as shown by the dash and dot lines. That is, the pivot 21 is first arranged at the joint 66. The member 10 is then arranged to coincide with the prolongation of the line 67, and the member 11 to coincide with the reaction 80.

The pivot 38 for the member 12 is then arranged at the joint 66 and the member 12 made to coincide with the line 68 and then the slide moved along the member 10 until the pivot 38 is arranged at the known proper distance from the joint 66 to indicate the known reaction. The distance from the pivot 38 to where the member 12 intersects the member 10 determines the stress in the truss member 68, and similarly, the distance from the joint 66 to the same intersection determines the stress in the member 67.

I have used the terms "straight-edges" and "straight-edge members" to describe the graduated or subdivided scale-carrying elements of the stressograph but I do not intend to be understood as limiting the stressograph to straight edges in the customary use of that term.

It will be understood that the various scales 49 may be arranged at parts of the members 10, 11 and 12 other than the edges 13, 14 and 15 thereof and the edges opposed thereto, and that the pivots 21 and 38 may similarly be arranged at points other than said edges without detracting from the efficacy and efficiency of the stressograph. For example, the scales 49 may be spaced inwardly from the edges of the members 10, 11 and 12 and the pivots 21 and 38 may also be arranged inwardly of said edges with their center lines lying in the line of the scales as otherwise positioned.

In using the term "straight-edges", therefore, I mean merely that the edge lines of the scales 49 are straight lines, and that the straight lines of said edges of the scales are to be arranged in coincidence with the center lines of the members indicated in the truss diagram as has been above described.

It will be understood, therefore, that the members 10, 11 and 12 may have edges of any desired shape, and are provided with properly subdivided scales at or near said edges, as for example, along the middle line of the member 85 (Fig. 13).

The scales are stamped, impressed or otherwise marked in a straight line longitudinally of said members. Said members are connected pivotally and slidably as above described at points arranged at the intersections of the straight lines of the scales, there being always one less pivot than there are members to provide ends freely movable in all directions in a plane on two of the members.

It will further be seen that an operator may soon acquire skill in the use of the stressograph, and by using said stressograph according to the method, examples of which have been hereinbefore described, may quickly and easily obtain accurate determinations of required stresses without the cumbersome methods of drawing stress diagrams heretofore used. The stressograph may also be used in connection with stress diagrams to check errors and inaccuracies in such diagrams with ease and rapidity.

It will be seen that the stressograph overcomes many of the disadvantages of present instruments, that my improved method may be carried out quickly and easily and that my invention is well adapted to meet the severe requirements of practical use.

While I have shown and described certain specific embodiments of my invention, I do not intend to be understood as limiting myself thereto but intend to claim my invention as broadly as may be permitted by the state of the prior art and the terms of the appended claims.

I claim:

1. A device for mechanically determining the stresses in the members of a truss from the truss diagram therefor, comprising a plurality of scale-carrying members each of uniform thickness throughout and having flat opposed faces, and adapted to be arranged in the form of a force polygon, each side of which corresponds to one of the forces at the joint of the truss in magnitude, line of application, and direction, pivots for swingably securing said members together in pairs, at least one of said pivots being slidable along one of the members, into coincidence with the other pivot to permit the rotation of said members into coincidence with lines radiating from a joint of a truss diagram, means for maintaining said pivots in predetermined relation to the edges of the members, aligned extensions on the members extending beyond the pivots, and stop means for the movable pivot to determine the position of coincidence of said pivots.

2. In a device of the character described, at least three scale-carrying members, an arcuate perforated lug projecting from the edge of each of said members at the zero points of the scales thereof, a flat head screw passing through the perforations of said lugs, a washer between the lugs, a nut on the screw, a similar lug on the edge of the third member, a sheet metal slide in the form of a pair of laterally spaced frames having edges integral with and joining said frames and spaced apart a distance greater than the width of the member on which it is mounted, a spring secured to one of said edges and engaging the adjacent edge of the member, a perforated corner lug on said slide, a bolt passing through the perforations of the corner lug and of the lug in said third member, means cooperating with the slide for limiting the movement of the slide in one direction to bring the axes of said screw and said bolt into alignment, a sheet metal spring secured to each of said members, and a pointed element depending from the spring and adapted to pass through a perforation in the member.

MORRIS BERMAN.